United States Patent [19]

Kinugawa et al.

[11] 4,146,656
[45] Mar. 27, 1979

[54] METHOD OF MANUFACTURING LIQUID CRYSTAL DISPLAY DEVICE INVOLVING CONTROLLING THE VAPOR DEPOSITION SPEED OF THE ORIENTATION LAYERS

[75] Inventors: Kiyoshige Kinugawa; Kazuhisa Toriyama; Hironari Tanaka, all of Mobara, Japan

[73] Assignee: Hitachi, Ltd., Tokyo, Japan

[21] Appl. No.: 722,435

[22] Filed: Sep. 13, 1976

[30] Foreign Application Priority Data

Sep. 19, 1975 [JP] Japan .................. 50-112681

[51] Int. Cl.² .................. G02F 1/13; C23C 13/04
[52] U.S. Cl. .................. 427/109; 350/341; 427/58; 427/167; 427/255; 428/1
[58] Field of Search .................. 428/1; 427/58, 109, 427/124, 255, 166, 167; 350/160 LC, 341; 29/572

[56] References Cited

U.S. PATENT DOCUMENTS

| | | | |
|---|---|---|---|
| 3,853,391 | 12/1974 | Sorkin .................. | 428/1 |
| 3,885,860 | 5/1975 | Sorkin .................. | 29/592 |
| 3,926,502 | 12/1975 | Tanka .................. | 428/1 |
| 3,938,242 | 2/1976 | Sussman .................. | 428/1 |
| 3,947,375 | 3/1976 | Gray .................. | 428/1 |
| 3,960,752 | 6/1976 | Klanderman .................. | 428/1 |
| 3,964,158 | 6/1976 | Janning .................. | 427/124 |
| 3,996,260 | 12/1976 | Oh .................. | 350/160 LC |
| 4,030,997 | 6/1977 | Miller et al. .................. | 427/38 |

*Primary Examiner*—Harris A. Pitlick
*Attorney, Agent, or Firm*—Charles E. Pfund

[57] ABSTRACT

A liquid crystal display device of the type comprising outer and lower substrates, electrodes formed on the inner surfaces of the substrates, liquid crystal orientation layers covering the protective films, and a liquid crystal interposed between the liquid crystal orientation films, is manufactured by forming the liquid crystal orientation layers by depositing SiO onto the protective films at a definite deposition angle with respect to the protective films and at a vapor deposition speed which varies in accordance with the type of the liquid crystal used.

6 Claims, 11 Drawing Figures

METHOD OF MANUFACTURING LIQUID CRYSTAL DISPLAY DEVICE INVOLVING CONTROLLING THE VAPOR DEPOSITION SPEED OF THE ORIENTATION LAYERS

BACKGROUND OF THE INVENTION

This invention relates to a method of manufacturing a liquid crystal display device in which the orientation of the liquid crystal molecules is controlled so as to provide a high quality display.

A field effect type liquid crystal display device is now widely used as the display element of table type electronic computers and digital wrist watches because of its low power consumption. The field effect type liquid crystal display device is constructed and operates as follows. More particularly, a liquid crystal having a positive dielectric anistropy (a liquid crystal wherein the dielectric constant along the longitudinal axis of the liquid crystal molecule is larger than that along an axis perpendicular to the longitudinal axis) is interposed between parallel upper and lower substrates made of glass, and the molecules of the liquid crystal are arranged in parallel with the interfaces between the upper and lower substrates and the liquid crystal. The orientation of the molecules is gradually twisted about 90° between both interfaces. The display element is arranged between a pair of polarizing plates having axes of polarization intersecting at right angles. Then, the light incident to the display device from outside is linearly polarized by one polarizing plate, then rotated through about 90° by the twisted arrangement of the molecules of the liquid crystal and then transmitted through the other polarizing plate. When a voltage of from several to several tens of volts is impressed across transparent electrodes which are mounted on the inner surfaces of the upper and lower substrates in a suitable pattern of a letter or digit, the molecules of the liquid crystal at a region in register with the electrodes applied with the voltage will come to orient in the direction of electric field which is substantially perpendicular to the direction of initial orientation of the molecules which was parallel with the interfaces. Under these conditions, the incident light will not be rotated by the molecules of the liquid crystal but will be intercepted by the other polarizing plate. Alternatively, if the display element is interposed between the upper and lower polarizing plates whose axes of polarization are parallel with each other, the incident light is intercepted by the molecules at a region in register with electrodes not applied with the voltage whereas the light is transmitted at a region in register with electrodes applied with the voltage. Thus, by the transmission and interception of the light effected by the above described operations, a digit or a pattern is displayed.

With the prior art liquid crystal display device constructed as above described, a display defect called an induced domain occurs when a voltage is impressed across the electrodes. More particularly, as will be discussed later with reference to the accompanying drawing, although the molecules of the liquid crystal tend to orient in a direction substantially parallel with the direction of the electric field when they are subjected to the field, actually they do not orient in a direction at right angles with respect to their direction of orientation under no field which is parallel with the interfaces. The orientation of the molecules of the liquid crystal occurs in such a manner that the left ends incline upwardly and the right ends incline upwardly with the same probability so that the directions of inclination of the molecules with respect to the upper substrate are different in one region from adjacent regions. For this reason, the displays in these two regions have different contrasts for the same direction of view thus causing a display including spots and degrading the quality of display markedly.

It has been proposed to provide a liquid crystal orientation layer having a directional property, that is a layer whose surface adjacent the liquid crystal has a property to orient the molecules of the liquid crystal in a definite direction when voltage is not impressed across the electrodes on the inner surfaces of the upper and lower substrates, for the purpose of eliminating the induced domain. The liquid crystal orientation layers are formed by vapor depositing a desired material on the inner surface of the upper or lower substrate from a source of vaporization disposed at a predetermined angle with respect to the inner surface of the upper or lower substrate. With prior art however, it is necessary to vary the angle of vapor deposition when the composition of the liquid crystal varies. Accordingly, the mechanism for varying the angle of vapor deposition is complicated and it has been desired to provide an improved and simple method of forming the liquid crystal orientation layers commensurate with the composition of the liquid crystal, which is suitable for the mass production of the liquid crystal display elements.

SUMMARY OF THE INVENTION

By experiment we have found that it is possible to obtain a liquid crystal orientation layer commensurate with the liquid crystals having different compositions by varying the speed of vapor deposition even when the angle of vapor deposition is maintained at a constant angle.

Thus, it is an object of this invention to provide a novel method of manufacturing a liquid crystal display device capable of eliminating the induced domain and providing a high quality display.

Another object of this invention is to provide a novel method of forming a liquid crystal orientation layer suitable for mass production.

According to this invention, there is provided a method of manufacturing a liquid crystal display device of the type comprising upper and lower substrates, transparent electrodes formed on the inner surfaces of the substrates, protective films covering the electrodes, liquid crystal orientation layers covering the protective films, and a liquid crystal interposed between the liquid crystal orientation layers, the method being characterized by the step of forming the liquid crystal orientation layers by vapor depositing an inorganic substance onto the protective films at a definite deposition angle with respect to the protective films and at a vapor deposition speed which is varied in accordance with the type of the liquid crystal used.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
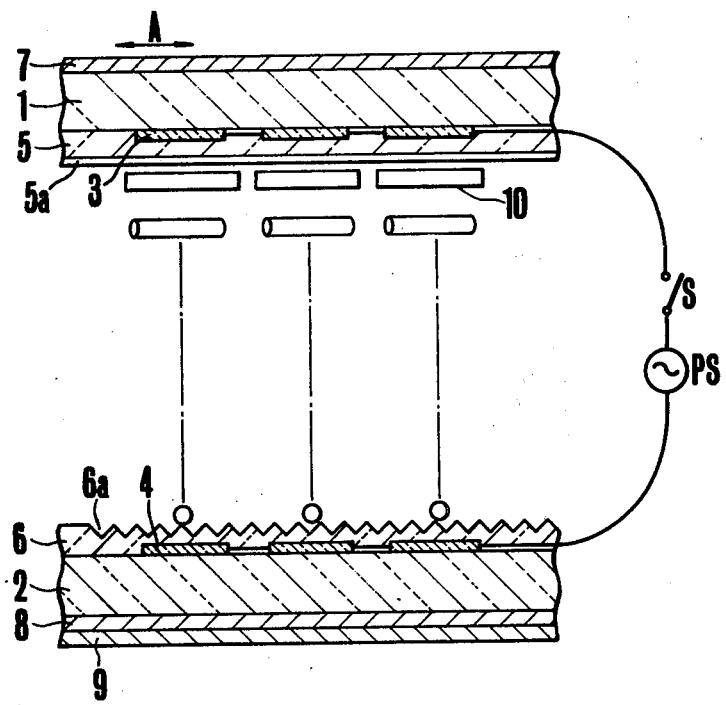
FIG. 1 is an enlarged sectional view of the essential portion of one example of a prior art liquid crystal display device showing a twisted orientation of the molecules of the liquid crystal when voltage is not impressed across the electrodes.

The outline of a prior art liquid crystal display device will now be described with reference to FIG. 1 which shows a reflection type field effect liquid crystal display device. The display device shown in FIG. 1 comprises upper and lower transparent substrates 1 and 2 usually made of insulative glass and transparent electrodes 3 and 4 formed on the inner surfaces of the upper and lower substrates respectively. The peripheries of the upper and lower substrates 1 and 2 are sealed with a definite gap therebetween by means of a peripheral sealing member, not shown, such as frit glass or the like thus defining a cell to be filled with a liquid crystal. A protective film 5 made of a transparent material, glass for example, is formed to cover the upper electrodes 3, the film 5 being provided on the inner surface thereof adjoining the liquid crystal with a liquid crystal molecule orientating structure 5a for arranging the liquid crystal molecules in a given, orientated direction. This orientating structure can be built by rubbing, with a piece of cotton or a sheet of paper for example, the inner surface of the protective film in the given direction or obliquely vapor-depositing silicon oxide, for example, onto the inner surface of the protective film.

Similarly, a protective film 6 is formed to cover the lower electrodes 4, the film 6 being provided on the inner surface thereof adjoining the liquid crystal with a liquid crystal molecule orientating structure 6a. It will be appreciated that as viewed from FIG. 1 the direction of orientation for the upper protective film 5 is parallel with the sheet of drawing and that for the lower protective film 6 is perpendicular to the sheet of drawing, whereby the uppermost and lowermost liquid crystal molecules are respectively orientated in these directions. Polarizing plates 7 and 8 are applied on the outer surfaces of the upper and lower substrates 1 and 2, respectively. Polarizing plate 7 polarizes light in the direction of arrow A, whereas polarizing plate 8 polarizes light in a direction perpendicular to arrow A, that is perpendicular to the sheet of drawing. A reflecting plate 9 is bonded to the polarizing plate 8. The molecule 10 of a liquid crystal filled into the cell through a suitable filling port, not shown, are shown diagrammatically. The cell, polarizing plates 7, 8, reflecting plate 9 and electrodes 3 and 4 constitute a liquid crystal display element. A source of alternating current PS having a voltage of several to several tens of volts is connected across the upper and lower electrodes through a switch S. The electrodes are constructed and energized to display a desired pattern in a manner well known in the art.

When voltage is not impressed across the upper and lower electrodes, the molecules of the liquid crystal near the protective film 5 for the upper electrode orient in parallel with the surface of the protective film 5 in the direction of the orientating structure (arrow A). This orientation is hereinafter termed a "no voltage orientation." On the other hand, the liquid crystal molecules adjacent the protective film 6 for the lower electrode orient in parallel with the surface of the protective film 6 in the direction of the orientating structure 6a, that is in the direction perpendicular to the sheet of drawing. Thus, the liquid crystal molecules in the cell are gradually twisted from the upper substrate to the lower substrate over an angle of about 90°. FIG. 1 shows the molecules which are twisted in the counterclockwise direction from the upper substrate to the lower substrate. Since the initial orientation of the molecules is determined by the physical configuration of the surface in contact with the molecules, and the chemical action between the substance of the surface and the liquid crystal, that is the interface interaction, it has been thought that the uppermost and lowermost molecules contiguous to the protective films 5 and 6 orient in the directions described above. When the interfaces are horizontal as shown in FIG. 1, the liquid crystal molecules can twist either in the clockwise or counterclockwise direction (because the energy required to twist the molecules is the same for both directions) but it is possible to cause the molecules to twist in a definite direction by adding to the liquid crystal an optically active substance such as cholesteric.

Figure 2:
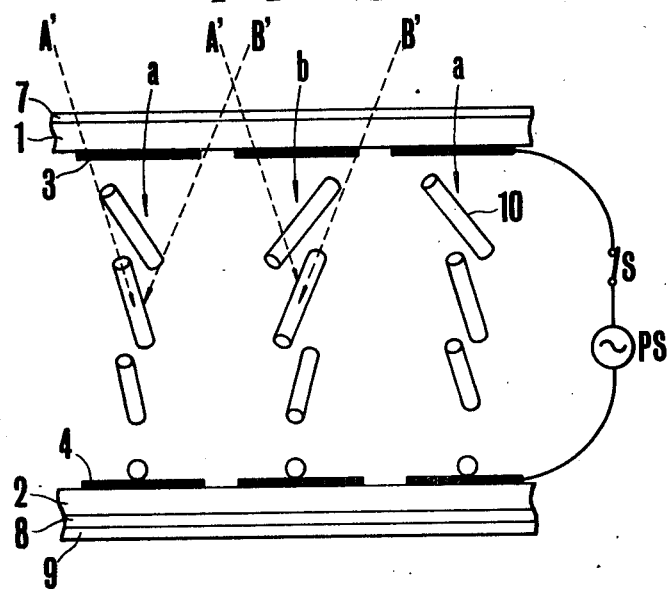
FIG. 2 is a view similar to FIG. 1, but showing the orientation of the molecules of the liquid crystal when voltage is impressed across the electrodes.
Figure 3:
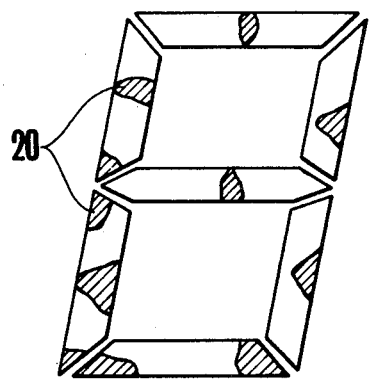
FIG. 3 is a plan view showing a displayed pattern provided by the device shown in FIG. 1.

FIG. 2 shows the orientation of the liquid crystal molecules when voltage is impressed across the electrodes of the display device shown in FIG. 1. FIG. 2 is simplified because it is intended to show the manner of varying the orientation of the molecules. As shown, under electric field, liquid crystal molecules 10 in regions "a" and "b" incline in different directions with respect to the upper substrate 1. More particularly, in region "a" the molecules orient with their left ends inclined upwardly while in region "b" with their right end inclined upwardly. Consequently, when viewed in the direction of dotted line arrows A', in region "a," as the molecules in the intermediate portion of the gap are viewed along their major axes the contrast is high. On the other hand, in region "b" as the molecules are viewed obliquely, the contrast is low. Similarly, when viewed in the direction of dotted line arrows B', in region "b," as the molecules in the intermediate portion of the gap are viewed along their major axes the contrast is high but in region "a," as the molecules are viewed obliquely, the contrast is low. Thus, in regions "a" and "b" the contrasts are different for a given direction of view, with the result that spots 20 appear in the displayed pattern as shown in FIG. 3, thus greatly degrading the quality of the display. Such right end up or left end up orientation may be attributed to the fact that the molecules which are initially parallel with the surfaces of the protective films under no voltage condition are held in a stable condition from which the molecules can incline in either direction when they are subjected to electric field.

Figure 4:
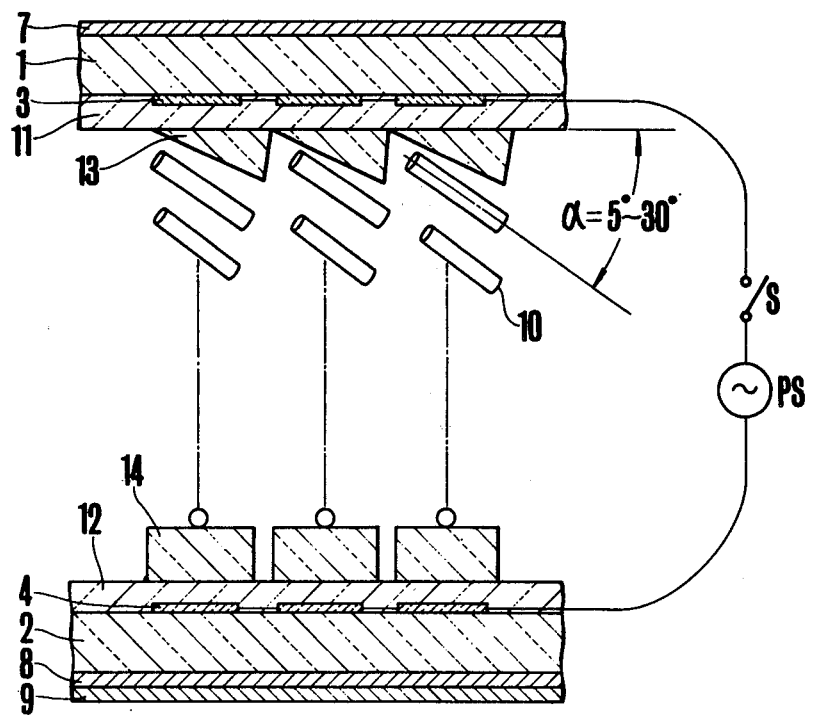
FIG. 4 is an enlarged sectional view of a portion of one example of a liquid crystal display device manufactured by the method of this invention showing the twisted orientation of the molecules of the liquid crystal when voltage is not impressed across the electrodes.

A preferred embodiment of this invention will now be described with reference to FIG. 4 in which elements corresponding to those shown in FIG. 1 are designated by the same reference numerals. As shown, according to this invention, the upper and lower interfaces are shaped such that the molecules of the liquid crystal incline 5° to 30° with respect to the upper and lower interfaces under no voltage condition. Thus, according to this invention, first and second liquid crystal orientation layers 13 and 14 each having a saw tooth sectional configuration are provided on the inner surfaces of the protective films 11 and 12. In the example shown in FIG. 4, the saw tooth patterns of the layers 13 and 14 intersect at right angles but they may intersect at an angle smaller than 90°, for example 80°. The liquid crystal orientation layers 13 and 14 are formed by vapor depositing SiO on the protective films 11 and 12 in a manner to be described later. Although SiO is vapor deposited, due to the combination of SiO with the composition of the protective films or with the oxygen in air it is presumed that the liquid crystal orientation layers have a composition of $SiO_x$ where $1 < x \leq 2$. For this reason, the pattern on the liquid crystal orientation layers shown in FIG. 4 is hereinafter termed an "SiOx island structure model."

Figure 5:
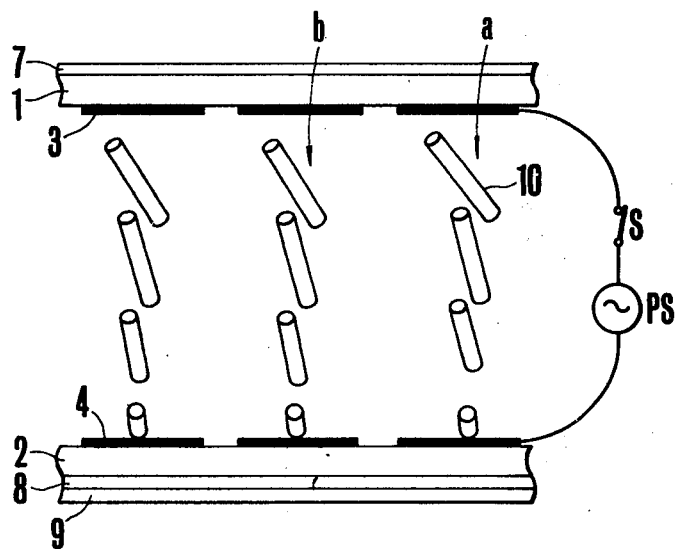
FIG. 5 is a view similar to FIG. 4 showing the orientation of the liquid crystal molecules when voltage is impressed across the electrodes.

As above described, the orientations of the liquid crystal molecules are determined by the chemical and physical interactions between the molecules and the composition of the surface with which the molecules are in contact. Accordingly, by the provision of island structure models having inclined surfaces for causing the liquid crystal molecules to orient in given directions, under no voltage condition the light crystal molecules orient in the given directions which are inclined by predetermined angles with respect to the substrate under the influence of the inclined surfaces. Since the energy required to twist the molecules in the counterclockwise direction as viewed from above of the upper substrate 1 is smaller than the energy required to twist the molecules in the clockwise direction, the molecules will twist in the counter-clockwise direction. When a voltage is impressed across the electrodes, the molecules initially oriented in a certain angle increase their inclination angle. Accordingly, as shown in FIG. 5 the molecules in both regions "a" and "b" will come to incline by the same angle with respect to the electrode protective films thus eliminating the induced domain caused by partially different orientation.

Figure 6:
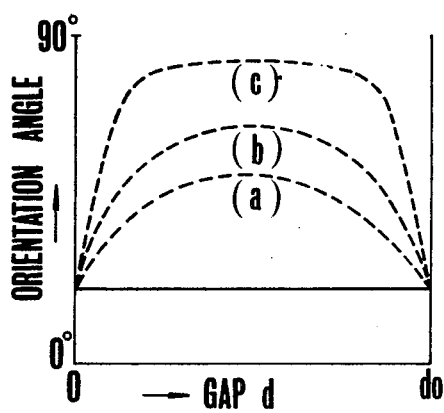
FIG. 6 is a graph showing the relationship between the gap between the upper and lower substrates and the orientation angle of the liquid crystal molecules.

FIG. 6 shows the relationship between the gap "d" of the cell and the orientation angle of the liquid crystal molecules in which a solid line shows the initial orientation and the dotted lines the orientation when voltage is impressed across the electrodes. It will be noted that the initial orientation has a certain orientation angle. It can also be noted that even when voltage is impressed the uppermost liquid crystal molecules (at gap do) and the lowermost liquid crystal molecules (at gap 0 (zero)) still maintain their initial orientations. As the impressed voltage is increased, curves a, b and c are obtained. When the voltage is increased, the angle of orientation and the number of oriented molecules at the intermediate portion of the gap increase.

Figure 7:
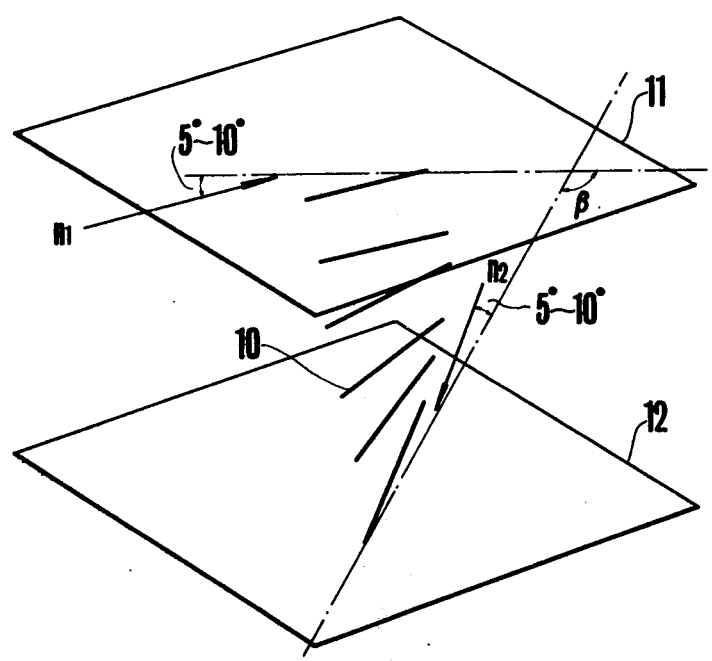
FIG. 7 is a diagrammatic representation to explain the novel method of forming a liquid crystal orientation layer of this invention.

To form liquid crystal orientation layer 13 or 14 having an SiOx island structure model, SiO is vapor deposited onto the upper protective film 11 at an angle of 5° to 10° in a direction shown by arrow $n_1$, and onto the lower protective film 12 also at an angle of 5° to 10° in a direction shown by arrow $n_2$, as shown in FIG. 7. The speed of vapor deposition is selected in accordance with the type of the particular composition of the liquid crystal so that the molecules of the liquid crystal may have an initial orientation inclined 5° to 30° with respect to the protective films 11 and 12 irrespective of the type of the liquid crystal. As will be described later, when the speed of vapor deposition is large, SiOx islands having a small inclination angle are formed and vice versa. As the molecules of the liquid crystal contain benzene nuclei and other radicals, the extent of the chemical and physical interactions between these radicals and the liquid crystal orientation layers varies for liquid crystals having different compositions. For this reason, the speed of vapor deposition must be varied depending upon the type of the liquid crystal in order to obtain an initial orientation of 5° to 30°.

The upper and lower substrates respectively provided with liquid crystal orientation layers are opposed at a particular angle $\beta$ of intersection.

The reason why the inclination angle between the liquid crystal molecules 10 and the protective films 11 and 12 is selected to be from 5° to 30° is as follows. When this angle is less than 5° it is impossible to eliminate the induced domain whereas when this angle is larger than 30° colour spots are formed in the displayed pattern under no voltage condition. By experiment, it was found that best range of this angle $\alpha$ is from 15° to 30°, and angles between 10° and 30° can be used with satisfactory result.

To control the initial orientation of the liquid crystal molecules, the measurement of the inclination angle $\alpha$ of the liquid crystal molecules 10 with respect to the protective films 11 and 12 is important. This angle $\alpha$ can be determined in the following manner. More particularly, the liquid crystal molecules 10 have a property to orient in the direction of magnetic field. For this reason, when the angles between the direction of the magnetic field and the upper and lower protective films 11 and 12 are determined at the time that the capacitance of the display element in the absence of the magnetic field coincides with that of the display element in the presence of the magnetic field, that angles are the angles between the liquid crystal molecules and the upper and lower protective films 11 and 12.

Figure 8:
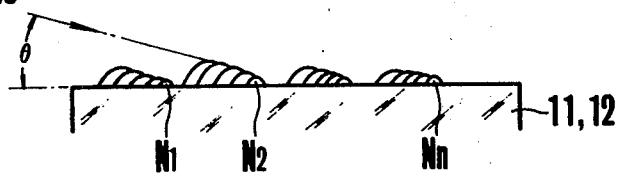
Figure 9:
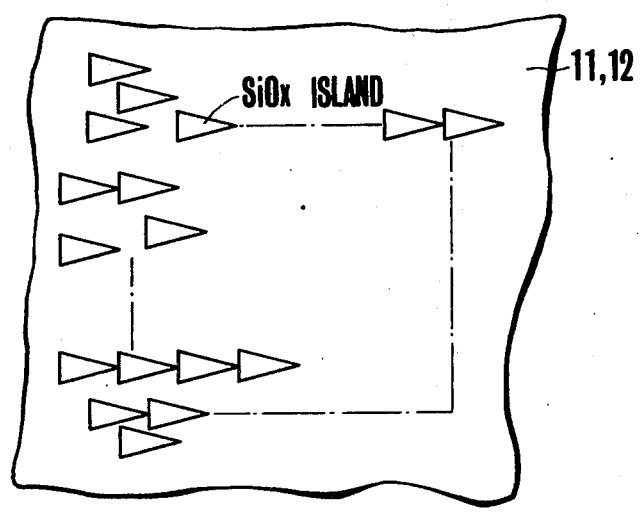

When SiO is vapor deposited on the surface of the protective film 11 or 12 at a deposition angle $\theta$ as shown in FIG. 8, the nuclei $N_1, N_2 \ldots N_n$ of SiO are firstly formed on the surface and then islands of SiO grow starting from the nuclei. With particular reference to nuclei $N_1$ and $N_2$, the layers of the vapor deposited SiO gradually grown from the nucleus $N_1$ interfere with the growth of the layer on the nucleus $N_2$. For this reason, islands grown from nuclei $N_1$ and $N_2$ are similar. In this manner, a plurality of triangular islands of SiOx are formed as shown in a plan view of FIG. 9. The SiOx island structure model showing the pattern of the liquid crystal orientation layers 13 and 14 can be understood from FIGS. 4 and 9.

Figure 10:
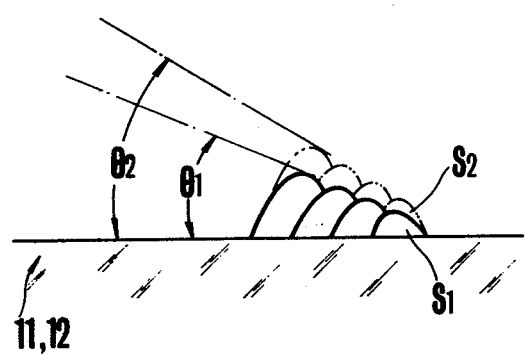
FIGS. 8, 9 and 10 are diagrams utilized to explain the method shown in FIG. 7.

FIG. 10 shows in an exaggerated manner the fact that the inclination of the SiOx islands vary as the speed of vapor deposition of SiO varies. In a single layer grown from a nucleus are contained a plurality of deposited SiO grains. The deposited grains tend to become spherical in an extremely short time but if the deposition speed is low, the number of grains participating in the spherical deposition increases so that larger spheres will be produced than at higher deposition speed. For this reason, a layer $S_1$ formed at higher deposition speed is smaller than a layer $S_2$ formed at lower deposition speed. In other words, at higher deposition speed $SiO_x$ islands having an inclination angle $\theta_1$ are formed but at lower deposition speed $SiO_x$ islands having a larger inclination angle $\theta_2$ are formed.

In the direction controlled vapor deposition described above, the deposition speed of SiO was varied variously and optimum speeds of vapor deposition for liquid crystals having different compositions were obtained.

EXAMPLE I

A 1:2 mixture of

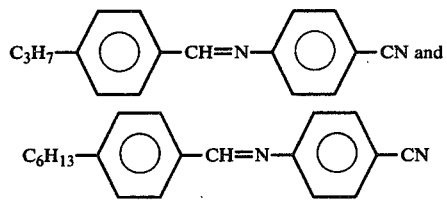

was used as a liquid crystal composition. It was found that the inclination angles of the liquid crystal molecules with respect to the upper and lower protective films 11 and 12 could be included in a hatched region P shown in FIG. 11 by varying the speed of vapor deposition. According to such method of varying the vapor deposition speed it is possible to readily vary the inclination angle of the liquid crystal molecules. The vapor deposition speed can be varied by controlling the evacuation presure within the vapor deposition chamber or by controlling the current flowing through an evaporation boat in a manner well known in the art. Current control is preferred because it is not necessary to use any complicated mechanism.

Figure 11:
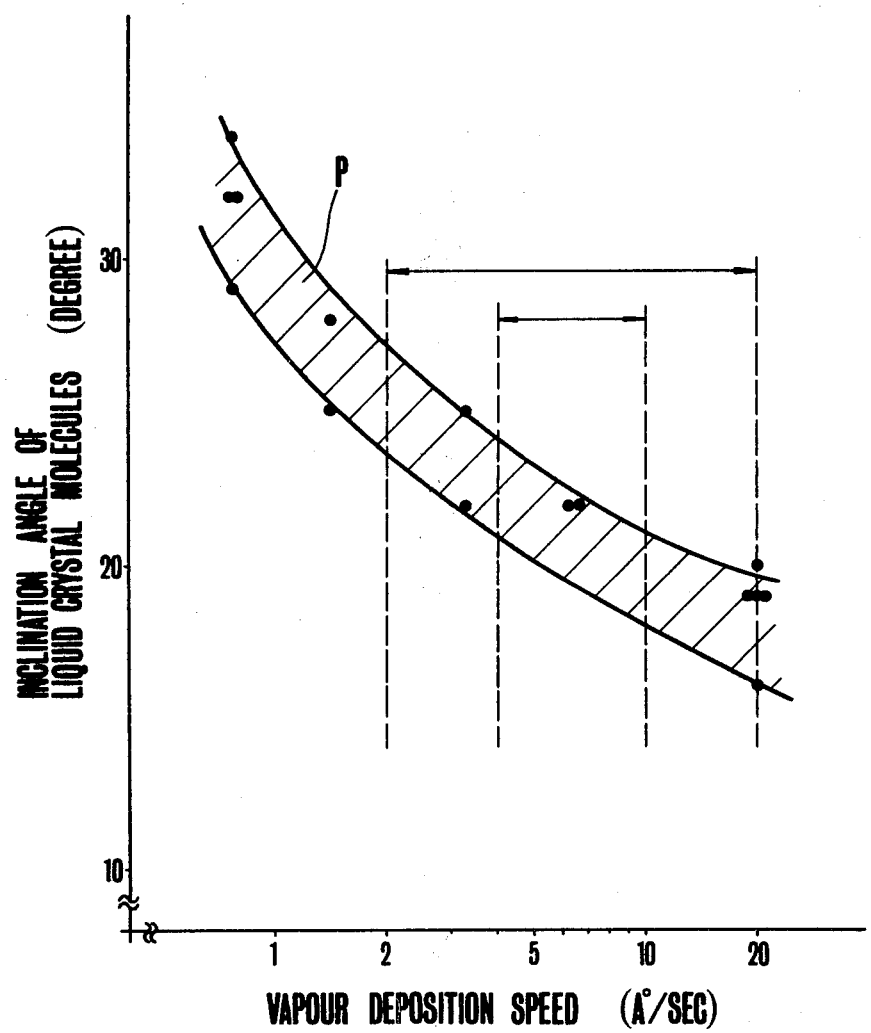
FIG. 11 shows characteristic curves useful to explain the novel method of manufacturing a liquid crystal display device of this invention.

As shown in FIG. 11, a minimum angle of 16° was obtained at a deposition speed of 20A/sec, and a maximum angle of 27° at a deposition speed of 2A/sec. This indicates that a satisfactory inclination angle of from 16° to 27° can be obtained by varying the deposition speed from 2Å/sec to 20Å/sec thus eliminating the induced domain and providing an excellent display. This is because by selecting the inclination angle of the molecules in the range of from 16° to 27° upon application of the voltage the same ends of all molecules rise up as shown in FIG. 5. To cause the same ends of the molecules to rise, it is generally necessary to select the inclination angle of the molecules with respect to the protective films 11 and 12 to be in a range of from 5° to 30°. Above described vapor deposition speed satisfies this condition. The optimum speed ranges from 4 to 10Å/sec, and the inclination angle at this time is from 18° to 24°. If the control is made such that the thickness of the liquid crystal orientation layer is less than 1000Å, uniform film thickness can be obtained thus providing a satisfactory display.

Other conditions utilized in this example were: a deposition angle of 10°, a degree of vacuum of 2 × $10^{-5}$ Torr, a boat current of 60 to 80A corresponding to a vapor deposition speed of 2Å/sec to 20Å/sec and a chamber temperature of 25° C. The vapor deposition speed was measured by using the variation in resonance frequency of a quartz oscillator supported in the same positional relationship as the substrate in terms of the distance from the evaporation source and the deposition angle.

EXAMPLE II

The advantage of example I was also obtained by using a Schiff system liquid crystal composition of the formula

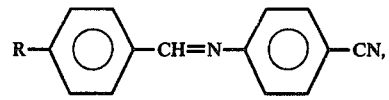

in the form of a simple substance or a mixture, where R represents $C_nH_{2n+1}$— or $C_nH_{2n+1}O$—. The preferred deposition speed in this case was from 4A/sec to 10A/sec.

EXAMPLE III

In this example, a biphenyl type liquid crystal composition having a formula

was used in the form of a simple substance or a mixture and a deposition speed of from 10A/sec to 50A/sec was used. Again, the same advantageous effect as in Examples I and II was obtained.

EXAMPLE IV

In this example, a mixture of the Schiff system and biphenyl system liquid crystals described above was used. In case of a 50:50 Schiff-biphenyl mixture, a preferred deposition speed of this example was about 5A/sec. With this speed, the inclination angle of the liquid crystal molecules with respect to the protective films 11 and 12 was from 23° to 24° which gave an excellent display.

In each example, when the deposition angle exceeds 14°, the liquid crystal molecules begin to orient in parallel with the upper and lower substrates, which of course is not suitable.

Further, where the liquid crystal composition referred to in the above examples is indicated as

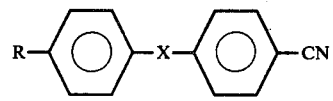

with the central radical X which is nullified for the biphenyl system liquid crystal and stands for —CH = N— for the Schiff system liquid crystal, it was found that the inclination angle of the liquid crystal molecule with respect to the protective film mainly depends on the central radical X and is almost independent of the terminal radical R representative of $C_nH_{2n+1}$— or $C_nH_{2n+1}O$—. Accordingly, it should be understood that the optimum evaporation speed range can be determined by the central radical X.

As above described, according to this invention while the deposition angle is maintained at a constant value, the deposition speed is varied in accordance with the type of the liquid crystal composition so that it is possible to cause the molecules of the liquid crystal to orient at an angle between 5° and 30° without using any complicated mechanism.

Although the invention has been described in terms of a field effect type liquid crystal display element it should be understood that the invention is also applicable to a DAP type liquid crystal display device.

What is claimed is:

1. A method of manufacturing a liquid crystal display device of the type comprising upper and lower substrates, transparent electrodes formed on the inner surfaces of said substrates, protective films covering said electrodes, liquid crystal orientation layers covering said protective films, and a liquid crystal,

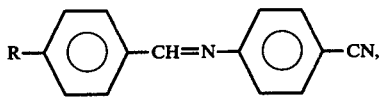

where R is selected from the group consisting of $C_nH_{2n+1}$ — and $C_nH_{2n+1}O$—, interposed between said liquid crystal orientation layers, said method comprising the step of forming said liquid crystal orientation layers by depositing an inorganic substance comprising SiO onto said protective films at a deposition angle of 5° to 10° with respect to said protective films and at a vapor deposition speed of 4Å/sec to 10Å/sec to provide an inclination angle of the molecule of the liquid crystal with respect to the protective film.

2. The method according to claim 1 wherein said deposition angle and said deposition speed form a series of islands of said inorganic substance on the surface of each protective film, said islands extending in the same direction.

3. The method according to claim 1 wherein said liquid crystal display device is of the field effect type and said series of islands on said protective films extend to substantially right angles.

4. The method according to claim 1 wherein said liquid crystal comprises a 1:2 mixture of

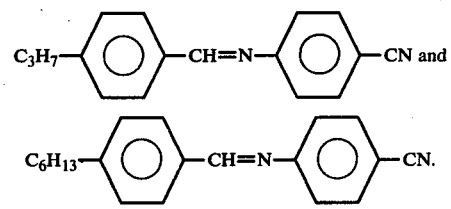

5. The method according to claim 1 wherein said liquid crystal comprises a Schiff system liquid crystal having a structure

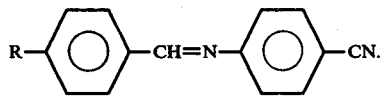

6. The method according to claim 1 wherein said liquid crystal comprises a mixture of a Schiff system liquid crystals having a structure

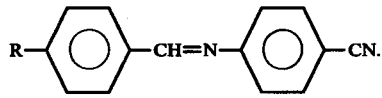

* * * * *